(12) United States Patent
Chavez

(10) Patent No.: US 7,246,398 B1
(45) Date of Patent: Jul. 24, 2007

(54) APPARATUS AND METHOD FOR REMOVING AN OBJECT FROM A DRAIN

(76) Inventor: Leonardo G. Chavez, 13863 Weidner St., Pacoima, CA (US) 91331

( * ) Notice: Subject to any disclaimer, the term of this patent is extended or adjusted under 35 U.S.C. 154(b) by 39 days.

(21) Appl. No.: 11/388,139

(22) Filed: Mar. 24, 2006

(51) Int. Cl.
*F16L 45/00* (2006.01)

(52) U.S. Cl. .............................. 15/104.32; 15/104.33; 294/82.13; 294/86.24; 294/86.25; 294/86.27; 294/86.29; 294/86.31

(58) Field of Classification Search ............... None
See application file for complete search history.

(56) References Cited

U.S. PATENT DOCUMENTS

| | | | | |
|---|---|---|---|---|
| 1,079,162 A | * | 11/1913 | Bundy | 294/86.14 |
| 1,772,437 A | * | 8/1930 | Ralph | 294/86.29 |
| 2,350,692 A | * | 6/1944 | Milek | 294/86.29 |
| 3,288,513 A | | 11/1966 | Bohrick | |
| 4,160,563 A | | 7/1979 | Whitney | |
| 4,787,659 A | | 11/1988 | Durham | |
| 4,934,089 A | | 6/1990 | Samar | |
| 5,203,241 A | | 4/1993 | Mattis | |
| D341,067 S | | 11/1993 | Clark et al. | |

* cited by examiner

*Primary Examiner*—David Redding

(57) ABSTRACT

An apparatus and method for removing an object from a drain for includes a pair of arms each having a first end, a second end, a medial portion, a first side and a second side. Each of the first sides is convexly curved. A pivot member extends between and is pivotally attached to the medial portions so that the first sides facing each other. A slide member engages each of the first sides and urges the first ends toward each other as the slide member moves toward the pivot member. An actuator is configured to selectively move the slide member toward or away from the pivot member. A connector is attached to the actuator and is configured to releasably couple the actuator to a drain snake. Rotation of the drain snake actuates the actuator to grip the object when the first ends are adjacent to the object.

7 Claims, 5 Drawing Sheets

APPARATUS AND METHOD FOR REMOVING AN OBJECT FROM A DRAIN

BACKGROUND OF THE INVENTION

1. Field of the Invention

The present invention relates to object gripping devices and more particularly pertains to a new object gripping device for positioning adjacent to and gripping an object positioned in a drain.

2. Description of the Prior Art

The use of object gripping devices is known in the prior art. While these devices fulfill their respective, particular objectives and requirements, the need remains for a device that allows someone to retrieve an object that is lost in a drain. In particular, the device should be attachable to a conventional drain snake for easy extension of the device into a drain. Further, the device should be relatively easy to actuate so that the object may be readably gripped with the device.

SUMMARY OF THE INVENTION

The present invention meets the needs presented above by generally comprising a pair of arms each having a first end, a second end, a medial portion positioned between the first and second ends, a first side and a second side. Each of the first sides is convexly curved. A pivot member extends between and is pivotally attached to the medial portions so that the first sides facing each other. A slide member engages each of the first sides and is selectively positioned between the second ends and the pivot member. The slide member urges the first ends toward each other as the slide member moves toward the pivot member. An actuator is mechanically coupled to the slide member and is configured to selectively move the slide member toward or away from the pivot member. A connector is attached to the actuator and is configured to releasably couple the actuator to a drain snake. Rotation of the drain snake actuates the actuator to grip an object positioned within a drain when the first ends are adjacent to the object.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
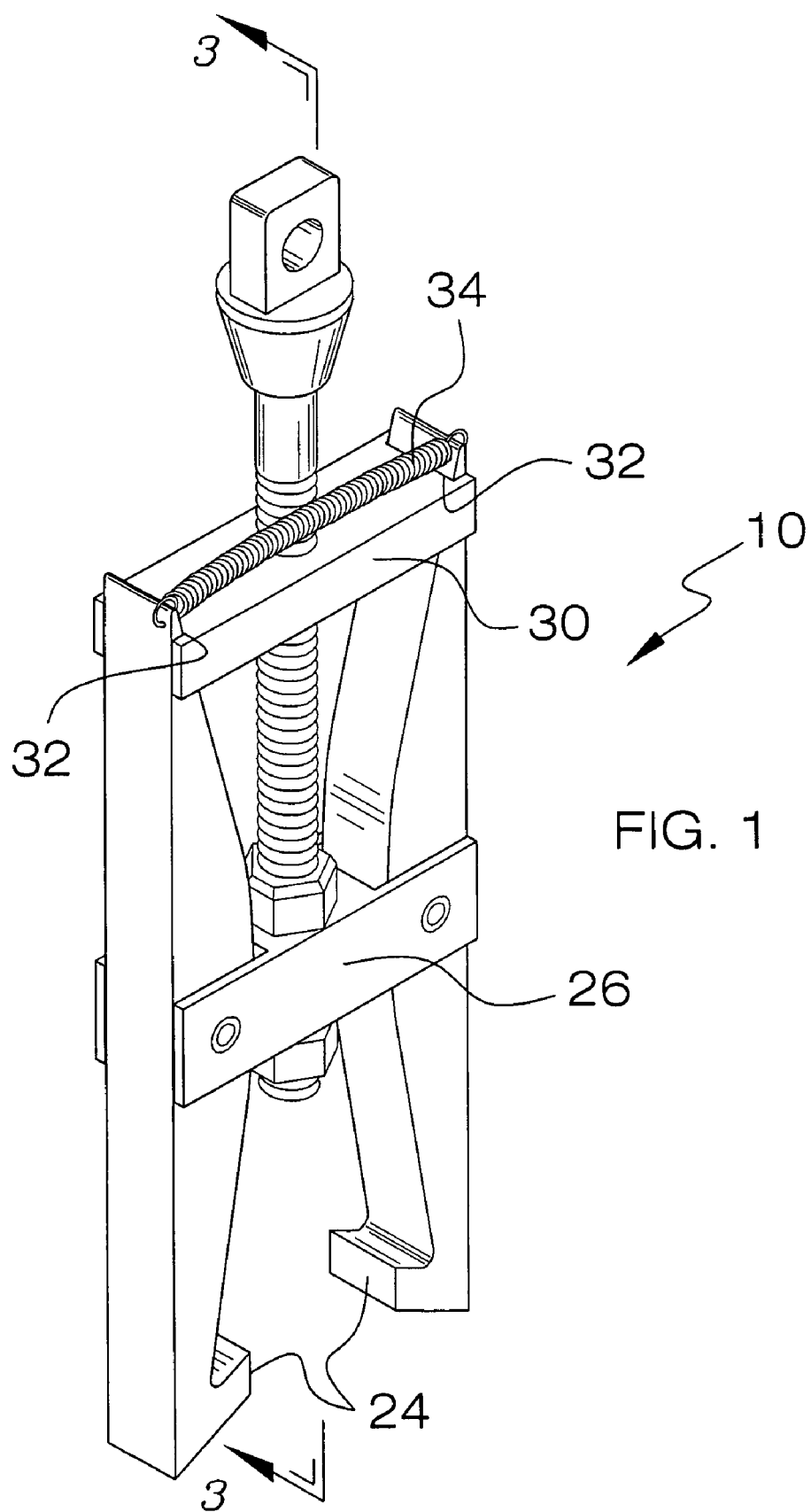
FIG. 1 is a perspective view of a apparatus and method for removing an object from a drain according to the present invention.
Figure 2:
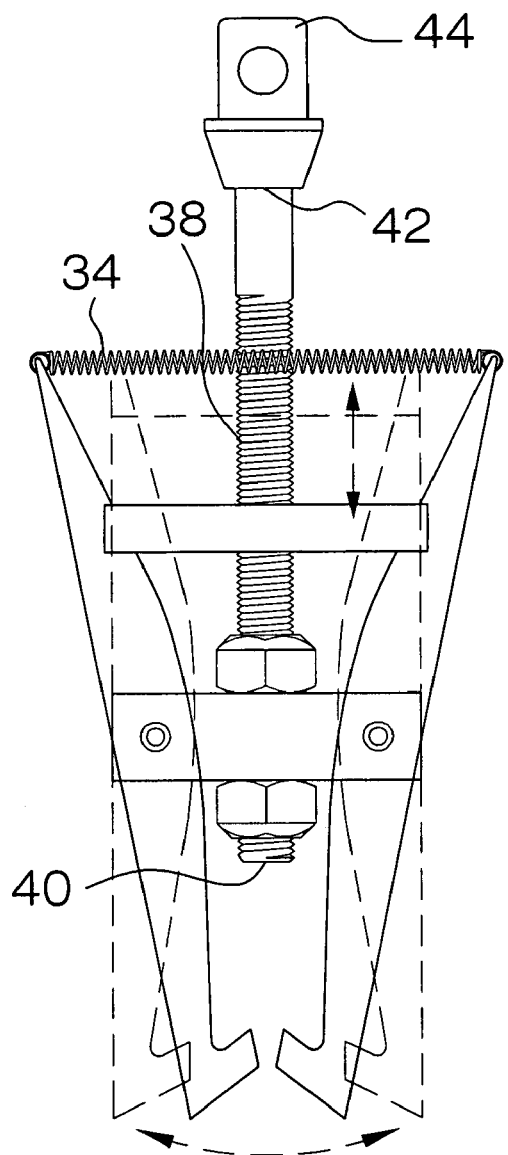
FIG. 2 is a front view of the present invention.
Figure 4:
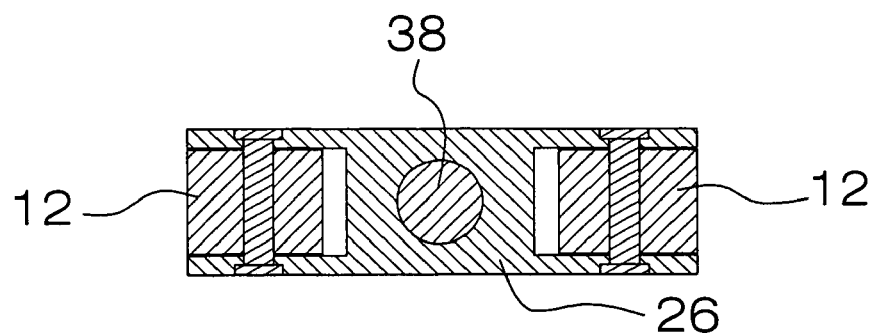
FIG. 4 is a cross-sectional view taken along line 4-4 of FIG. 3 of the present invention.
Figure 3:
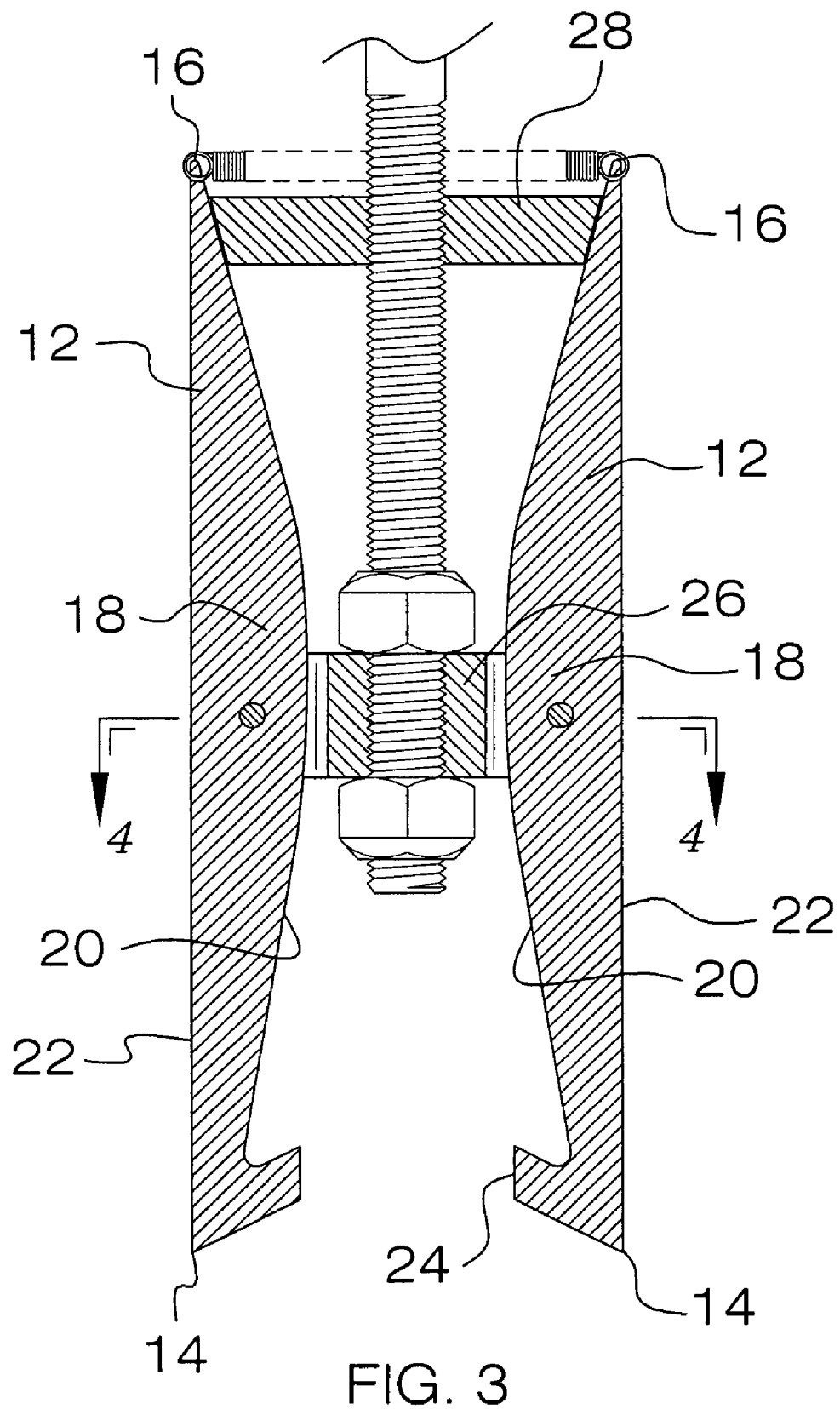
FIG. 3 is a cross-sectional view taken along line 3-3 of FIG. 1 of the present invention.
Figure 5:
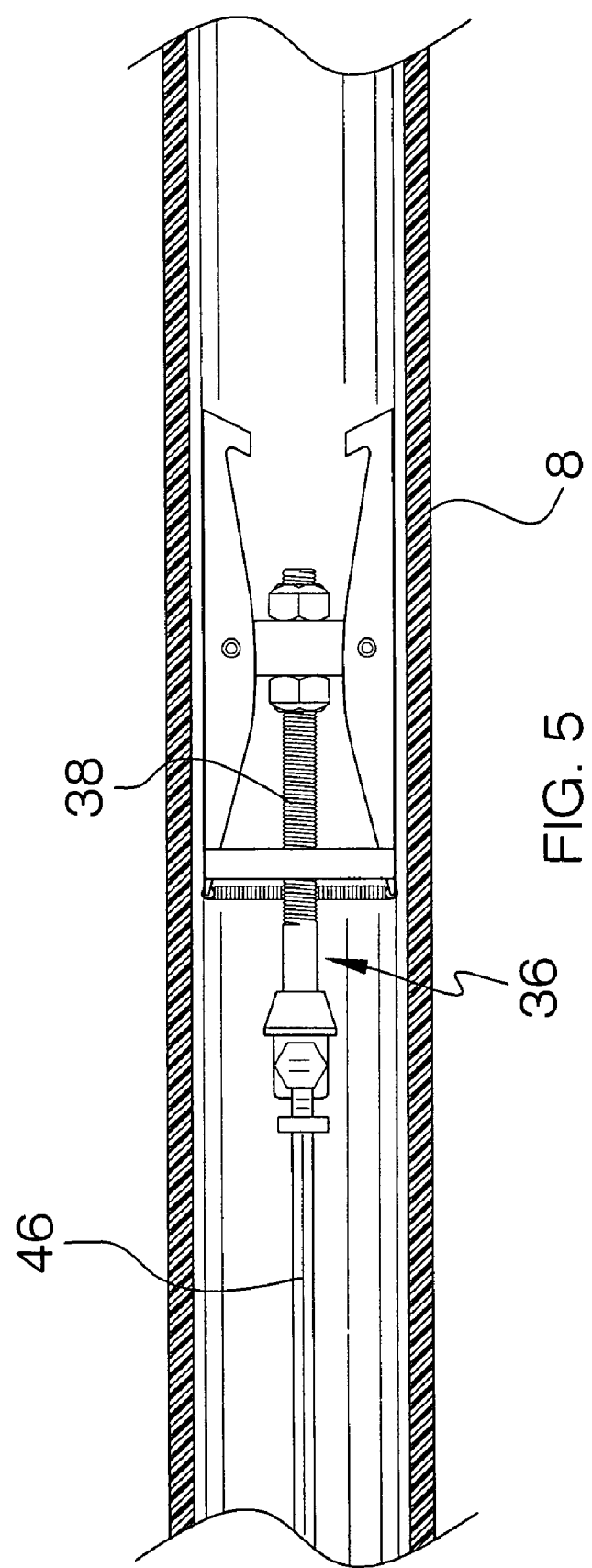
FIG. 5 is a front in-use view of the present invention.

With reference now to the drawings, and in particular to FIGS. 1 through 6 thereof, a new object gripping device embodying the principles and concepts of the present invention and generally designated by the reference numeral 10 will be described.

As best illustrated in FIGS. 1 through 6, the apparatus 10 and method for removing an object from a drain 8 generally comprises a pair of arms 12 each having a first end 14, a second end 16, a medial portion 18 positioned between the first 14 and second 16 ends, a first side 20 and a second side 22. Each of the first sides 20 is convexly curved from the first ends 14 to the second ends 16.

A pair of hook members 24 is provided. Each of the first ends 14 has one of the hook members 24 attached thereto. The hook members 24 abut the first sides 20 and are preferably angled toward the second ends 16. A pivot member 26 extends between and is pivotally attached to the medial portions 18. The first sides 20 and the hook members 24 face each other.

Figure 6:
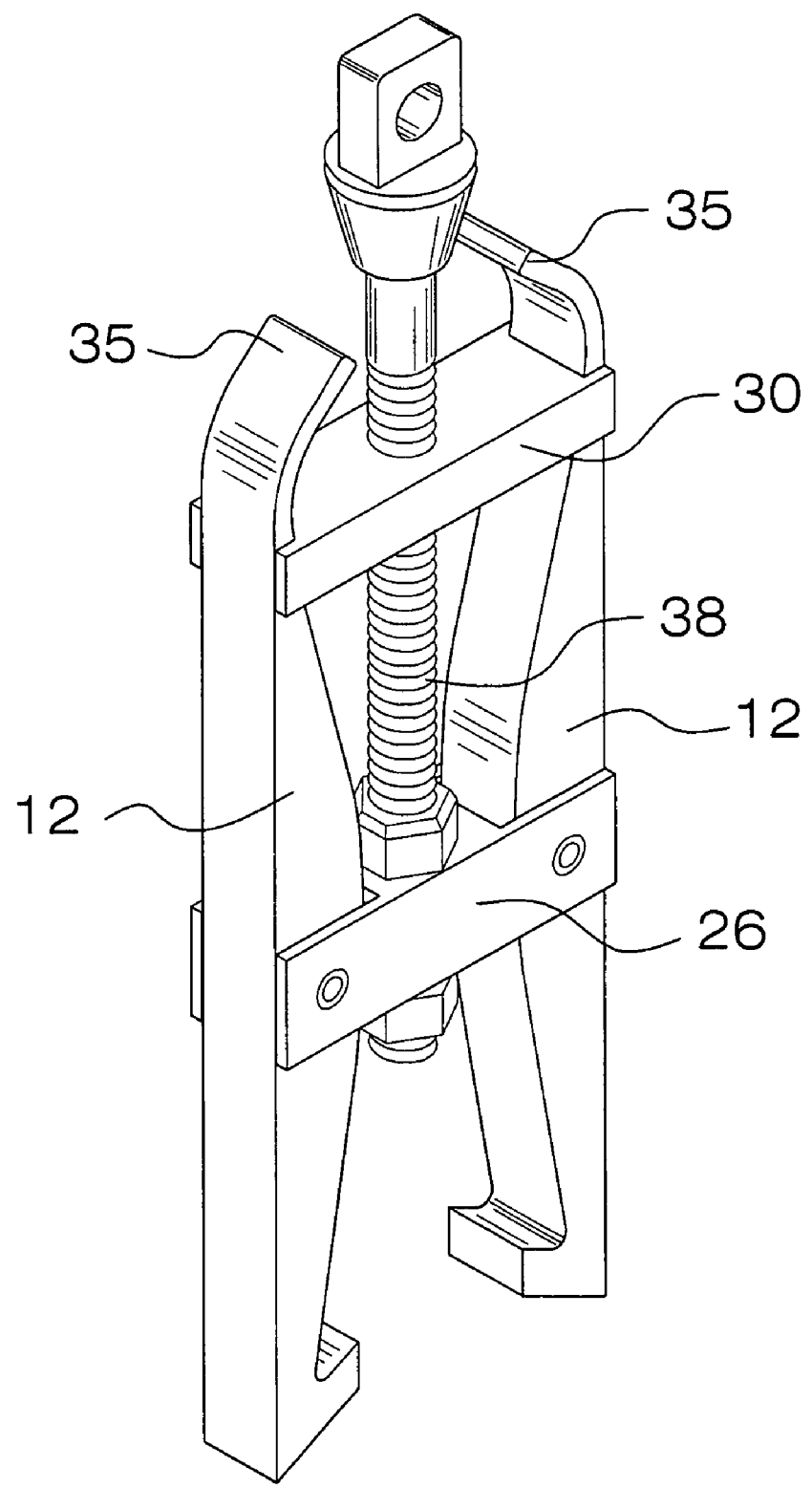
FIG. 6 is a perspective view of a second embodiment of the present invention.

A slide member 28 engages each of the first sides 20 and is selectively positioned between the second ends 16 and the pivot member 26. The slide member 28 urges the first ends 14 toward each other as the slide member 28 moves toward the pivot member 26. The slide member 28 includes an elongated panel 30 having a pair of opposite ends each having a notch 32 therein. Each of the first sides 20 is positioned in one of the notches 32. A biasing member 34 is attached to and extends between the second ends 16. The biasing member 34 may comprise a spring that biases the second ends 16 toward each other. FIG. 6 includes a second embodiment not including a biasing member 34 but a pair of finger grips 35 attached to the second ends 16 for urging the first ends 14 apart from each other.

An actuator 36 is mechanically coupled to the slide member 28 and is configured to selectively move the slide member 28 toward or away from the pivot member 26. The actuator 36 comprises a rod 38 having a lower end 40 and an upper end 42. The rod 38 is rotatably coupled to the pivot member 26 adjacent to the lower end 40. The rod 38 extends through and is threadably coupled to the slide member 28.

A connector 44 is attached to the actuator 36 and is configured to releasably couple the actuator 36 to a drain snake 46. Rotation of the drain snake 46 actuates the actuator 36. The connector 44 comprises a loop attached to the upper end 42 of the rod 38.

In use, the drain snake 46 is attached to the connector 44 and the arms 12 extended into the drain 8. The first ends 14 are positioned adjacent to the object positioned in the drain 8. The object may be any item such as a piece of jewelry that falls into the drain 8. The actuator 36 is actuated and the object gripped with the hook members 24 or arms 12. The object is then pulled out of the drain 8.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An object retrieval assembly for removing an object from a drain, said assembly comprising:
   a pair of arms, each of said arms having a first end, a second end, a medial portion positioned between said first and second ends, a first side and a second side, each of said first sides being convexly curved;
   a pivot member extending between and being pivotally attached to said medial portions, said first sides facing each other;
   a slide member engaging each of said first sides and being selectively positioned between said second ends and said pivot member, said slide member urging said first ends toward each other as said slide member moves toward said pivot member;
   an actuator being mechanically coupled to said slide member and being configured to selectively move said slide member toward or away from said pivot member;
   a connector being attached to said actuator and being configured to releasably couple said actuator to a drain snake, wherein rotation of the drain snake actuates said actuator; and
   a biasing member being attached to and extending between said second ends, said biasing member biasing said second ends toward each other.

2. The assembly according to claim 1, further including a pair of hook members, each of said first ends having one of said hook members attached thereto, said hook members abutting said first sides and facing each other.

3. The assembly according to claim 1, wherein said slide member includes an elongated panel having a pair of opposite ends each having a notch therein, each of said first sides being positioned in one of said notches.

4. The assembly according to claim 3, wherein said actuator comprises a rod having a lower end and an upper end, said rod being rotatably coupled to said pivot member adjacent to said lower end, said rod extending through and being threadably coupled to said slide member.

5. The assembly according to claim 4, wherein said connector comprises a loop attached to said upper end of said rod.

6. An object retrieval assembly for removing an object from a drain, said assembly comprising:
   a pair of arms, each of said arms having a first end, a second end, a medial portion positioned between said first and second ends, a first side and a second side, each of said first sides being convexly curved;
   a pair of hook members, each of said first ends having one of said hook members attached thereto, said hook members abutting said first sides;
   a pivot member extending between and being pivotally attached to said medial portions, said first sides and said hook members facing each other;
   a slide member engaging each of said first sides and being selectively positioned between said second ends and said pivot member, said slide member urging said first ends toward each other as said slide member moves toward said pivot member, said slide member including an elongated panel having a pair of opposite ends each having a notch therein, each of said first sides being positioned in one of said notches;
   an actuator being mechanically coupled to said slide member and being configured to selectively move said slide member toward or away from said pivot member, said actuator comprising a rod having a lower end and an upper end, said rod being rotatably coupled to said pivot member adjacent to said lower end, said rod extending through and being threadably coupled to said slide member;
   a connector being attached to said actuator and being configured to releasably couple said actuator to a drain snake, wherein rotation of the drain snake actuates said actuator, said connector comprising a loop attached to said upper end of said rod; and
   a biasing member being attached to and extending between said second ends, said biasing member biasing said second ends toward each other.

7. A method for retrieving an object from a drain comprising the steps of:
   providing a pair of arms, each of said arms having a first end, a second end, a medial portion positioned between said first and second ends, a first side and a second side, each of said first sides being convexly curved;
   providing a pair of hook members, each of said first ends having one of said hook members attached thereto, said hook members abutting said first sides;
   providing a pivot member extending between and being pivotally attached to said medial portions, said first sides and said hook members facing each other;
   providing a slide member engaging each of said first sides and being selectively positioned between said second ends and said pivot member, said slide member urging said first ends toward each other as said slide member moves toward said pivot member, said slide member including an elongated panel having a pair of opposite ends each having a notch therein, each of said first sides being positioned in one of said notches;
   providing an actuator being mechanically coupled to said slide member and being configured to selectively move said slide member toward or away from said pivot member, said actuator comprising a rod having a lower end and an upper end, said rod being rotatably coupled to said pivot member adjacent to said lower end, said rod extending through and being threadably coupled to said slide member;
   providing a connector being attached to said actuator and being configured to releasably couple said actuator to a drain snake, wherein rotation of the drain snake actuates said actuator, said connector comprising a loop attached to said upper end of said rod; and
   providing a biasing member being attached to and extending between said second ends, said biasing member biasing said second ends toward each other;
   attaching the drain snake to said connector;
   extending said arms into the drain;
   positioning said first ends adjacent to the object;
   actuating said actuator and gripping the object with the hook members; and
   pulling the object out of the drain.

\* \* \* \* \*